Figure 1:
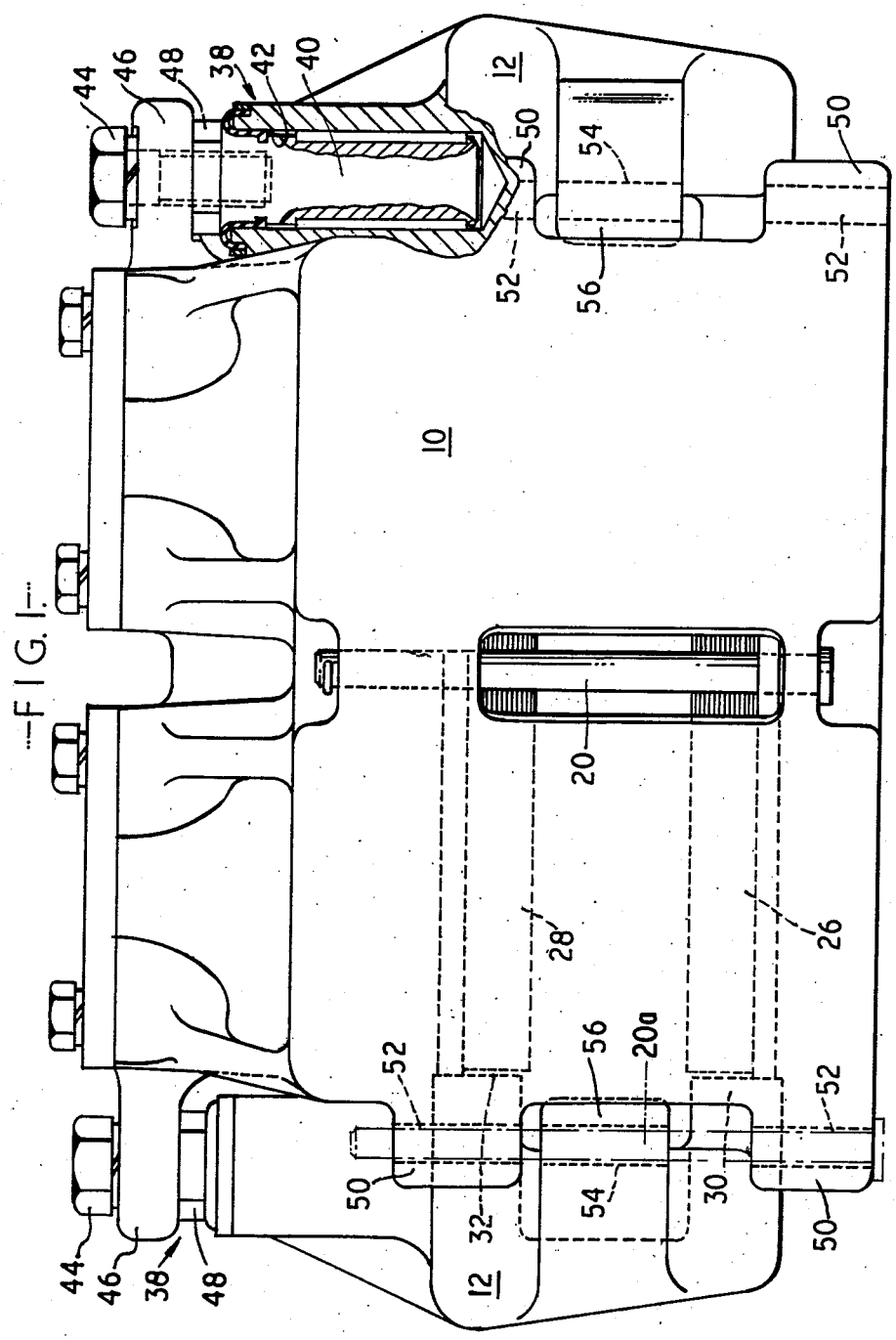

United States Patent [19]
Hönick

[11] 4,111,285
[45] Sep. 5, 1978

[54] SLIDABLE CALIPER AND PIVOTAL MOUNTING MEANS THEREFOR

[75] Inventor: Hermann Hans Hönick, Immendorf, Germany

[73] Assignee: Girling Limited, Birmingham, England

[21] Appl. No.: 744,818

[22] Filed: Nov. 24, 1976

Related U.S. Application Data

[63] Continuation of Ser. No. 455,747, Mar. 28, 1974, abandoned.

[30] Foreign Application Priority Data

Apr. 5, 1973 [GB] United Kingdom ............... 16264/73

[51] Int. Cl.² .......................................... F16D 65/02
[52] U.S. Cl. .................................................. 188/73.6
[58] Field of Search .................... 188/71.1, 72.4, 73.3, 188/73.4, 73.6

[56] References Cited

U.S. PATENT DOCUMENTS

| 3,081,843 | 3/1963 | Dotto et al. | 188/73.6 |
| 3,374,866 | 3/1968 | Miles | 188/73.3 |
| 3,656,590 | 4/1972 | Newstead | 188/73.3 |
| 3,917,033 | 11/1975 | Rath et al. | 188/73.3 |
| 3,930,564 | 1/1976 | Kobayashi et al. | 188/73.6 |

*Primary Examiner*—Stephen G. Kunin
*Assistant Examiner*—Edward R. Kazenske
*Attorney, Agent, or Firm*—Scrivener, Parker, Scrivener & Clarke

[57] ABSTRACT

A disc brake having a caliper mounted for sliding on a torque plate has a facility for forming a temporary pivotal connection between the caliper and torque plate so that the caliper may be supported by the torque plate when the sliding connection is released for servicing. The pivotal connection is preferably formed by inserting a pivot pin such as the pin which normally supports the friction pads into openings in the caliper and torque plate.

13 Claims, 2 Drawing Figures

SLIDABLE CALIPER AND PIVOTAL MOUNTING MEANS THEREFOR

This is a continuation of application Ser. No. 455,747 filed Mar. 28, 1974 now abandoned.

The present invention relates to sliding caliper disc brakes of the type having a torque plate member adapted for fixing to a vehicle frame or like portion and a caliper member mounted on the torque plate member for moving friction pads into engagement with a rotatable disc.

In many such disc brakes it is necessary to disconnect the caliper member from the torque plate member to gain access to the friction pads. In the case of disc brakes having a caliper member which is slidably mounted on the torque plate member by way of one or more pins, it is often possible to leave the pin or one of the pins connecting the two members and to pivot the caliper member about that pin to gain access to the friction pads. Where there is limited space between the disc periphery and the associated vehicle wheel, it may become necessary to arrange the or each pin on one side only of the disc and within the radial extent of the disc. In such constructions, the shapes of the caliper member and torque plate member may be such that the caliper member cannot be pivoted sufficiently far about the pin or one of the pins to allow access to the friction pads. The caliper member thus has to be completely removed from the torque plate member.

The present invention seeks to provide a means to support the caliper member when the slidable mounting between the two members has been released.

According to the present invention, there is provided a sliding caliper disc brake comprising a torque plate member adapted for fixing to a vehicle frame or like portion, a caliper member mounted on the torque plate member for moving friction pads into engagement with a rotatable disc, a first releasable connection between the caliper member and the torque plate member permitting movement of the caliper member relative to the torque plate member only in the direction of the axis of disc rotation, and means on said members independent of the first connection to provide a second connection between the caliper member and the torque plate member permitting pivoting of the caliper member relative to the torque plate member when said first connection is released.

The first releasable connection preferably comprises two sets of sliding surfaces disposed one each side of the caliper member and in the described embodiment comprises two pin assemblies releasably clamped to the caliper member and slidable in openings in the torque plate member whereby the sliding surfaces of the pin assemblies and torque plate can remain in situ when the caliper member is disconnected from the torque plate member.

Whilst the means to provide the second connection may be interengageable formations on the caliper member and torque plate member, it is preferred that such means comprise bores formed in the two members and adapted to receive a pin which is conveniently a retaining pin normally positioned across the caliper member and serving to locate the friction pads with respect to the caliper member. The bores in the two members may be aligned in the normal operative position of the caliper member on the torque plate member or may be out of alignmemt in said normal operative position in which case it is necessary to manipulate the caliper member with respect to the torque plate member to align the bores and permit insertion of the pin.

Figure 2:
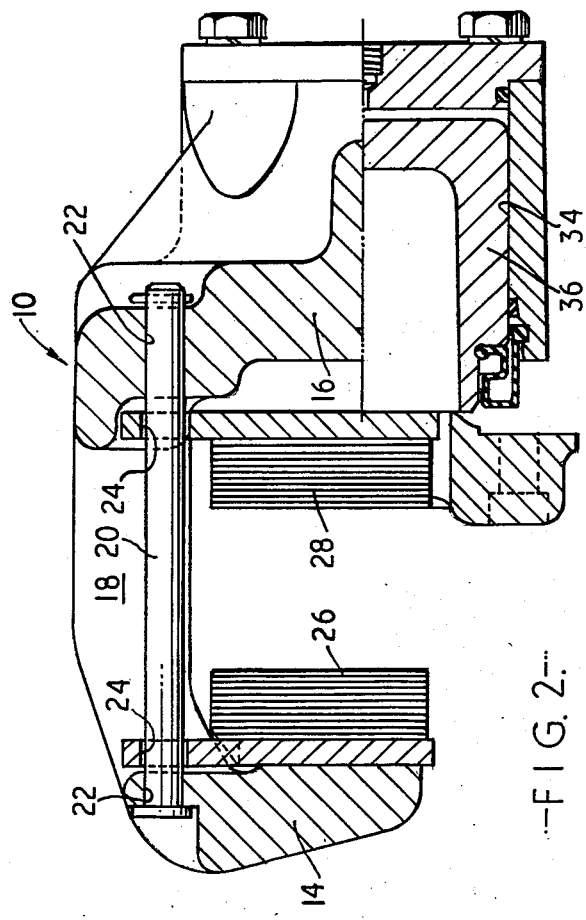

The invention is further described, by way of example, with reference to the accompanying drawings in which:

FIG. 1 is a top plan view of a caliper member and torque plate member of a sliding caliper disc brake constructed in accordance with one embodiment of the invention, partially sectioned to show a sliding connection between the caliper member and torque plate member; and FIG. 2 is a medial section through the caliper member of FIG. 1 also sectioned to show a part of an actuating piston.

Referring to FIG. 1 of the drawings, a caliper member 10 is slidably mounted on a torque plate member most of which is not visible in FIG. 1 but which has two outwardly directed arms 12 extending beyond the caliper member 10. The caliper member 10 is seen from FIG. 2 to comprise a front limb 14 and a rear limb 16 connected by a crown portion 18. Extending across the crown portion 18 is a pad retaining pin 20 which passes through aligned bores 22 in the front and rear limbs 14 and 16 and through bores 24 in backing plates of front and rear friction pad assemblies 26 and 28. In addition to being retained by the pin 20, the pad assemblies 26 and 28 are guided by pairs 30 and 32 of lugs extending inwardly from the arms 12 of the torque plate member (FIG. 1).

The rear limb 16 of the caliper is formed with a pair of hydraulic cylinders 34 each containing a piston 36 displaceable in response to fluid pressure within its cylinder to move the pad assembly 28 into braking engagement with a brake disc (not shown). An independent hydraulic supply may be provided for each of the cylinders 34 and the cylinder bore sizes may be unequal. By virtue of the reaction resulting from engagement of the pad assembly 28 with the disc, the caliper member is caused to slide with respect to the torque plate member thereby to engage the front pad assembly 26 with the opposite face of the brake disc.

The caliper member is slidably mounted on the torque plate member by means of two pin assemblies 38, one of which is shown in section in FIG. 1. Each of the pin assemblies 38 comprises a plunger 40 slidable in an oversize bore 42 in the torque plate member and a clamping screw 44 by which the plunger 40 is clamped to a lug 46 extending from the caliper member. The plunger 40 is formed with grooves extending along its length and housing resilient, preferably tubular, bearing elements which centre the plunger in the oversize bore 42. Removal of the clamping screws 44 permits removal of the caliper member from the torque plate member without separation of the sliding surfaces by which the caliper member is enabled to slide during brake operation. Protruding portions of the plungers 40 are provided with a tool engaging formation such as a hexagon head 48 by which the plungers are restrained from rotation during removal of the clamping screws 44.

In some designs of pin-mounted sliding caliper disc brake, it is necessary to dismantle only one of the pin assemblies whereupon the caliper may be pivoted about the other pin assembly sufficiently far to provide access to the friction pads. In other designs, the configurations of the caliper and torque plate do not permit sufficient pivotal movement about one of the pin assemblies, especially when the pin assemblies are arranged near to or within the outer periphery of the disc. It is thus necessary to completely remove the caliper by dismantling both of the pin assemblies. The only connection then remaining between the caliper and the vehicle from which it has been removed is by way of the hydraulic hose or hoses which are not intended to support the weight of the caliper and may be damaged if the caliper is allowed to hang by the hose or hoses.

The illustrated brake thus provides for a temporary pivotal connection between the caliper member and the torque plate member which allows pivoting about an axis spaced from the axes of the pin assemblies and permitting sufficient pivotal movement to provide access to the friction pads. Referring to FIG. 1, at each side of the brake, the caliper member has two outwardly directed lugs 50 through which extend two aligned bores 52 which are also aligned with a bore 54 through an inwardly directed lug 56 extending from the torque plate member. The bores 52 and 54 are dimensioned to receive temporarily the retaining pin 20 as shown by phantom lines at 20a in FIG. 1.

To gain access to the friction pads, the retaining pin 20 is withdrawn from the bores 22 in the front and rear limbs of the caliper member and introduced into one or other of the sets of bores 52,54, both clamping screws 44 are removed and the caliper member is pivoted about the retaining pin 20 which thereby supports the caliper member.

In the embodiment illustrated, the bores 52 and 54 are aligned in the normal operative positions of the caliper and torque plate members so that the retaining pin 20 may be introduced into one of the sets of bores 52,54 before the clamping screws 44 are removed. However, the bores 52 may be out of alignment with the bores 54 when the caliper member is in its operative position on the torque plate member in which case at least one of the pin assemblies must be dismantled before the retaining pin 20 may be transferred from the bores 22 to the bores 52,54.

The invention is also applicable to sliding caliper disc brakes in which the caliper is not pin-mounted. It is merely necessary that there be provision for dismantling the sliding connection between the caliper and torque plate and provision for a temporary pivotal connection between the caliper and torque plate. Whilst the use of a pin, conveniently a pin such as a pad retaining pin which can be removed temporarily from the brake assembly, to provide the pivotal connection is preferred, the pivotal connection could alternatively be between interengageable formations on the caliper member and torque plate member, for example, a spigot on one of the members engageable in an opening in the other member. The configurations of the two members is often such that the temporary pivotal connection must have its axis outwardly of the outer periphery of the brake disc to permit sufficient pivotal movement to fully expose the pad assemblies.

I claim:

1. In a sliding caliper disc brake of the type comprising a torque plate member adapted for fixing to a vehicle frame or like portion, a unitary caliper assembly, means moveably mounting said caliper assembly on the torque plate member, said caliper assembly carrying spot-type friction pads adapted for movement into engagement with opposed faces of a rotatable disc, said caliper assembly being constructed that the pads cannot be removed or replaced with the caliper assembly in its normal operative position relative to the disc, said mounting means comprising a first releasable connection between the unitary caliper assembly and the torque plate member, said first connection comprising two sets of sliding surfaces disposed one set on each circumferential side of the caliper assembly, said two sets of sliding surfaces being constructed and arranged to permit movement of the caliper assembly relative to the torque plate member only in the direction of the axis of disc rotation and also being arranged that said caliper assembly cannot be moved to a position relative to the torque plate member in which the pads may be removed from the caliper assembly without complete release of said two sets of sliding surfaces the improvement comprising means on said torque plate member and said caliper assembly independent of said two sets of sliding surfaces for providing a second connection between said caliper assembly and said torque plate member which enables said caliper assembly to be moved to a position relative to said torque plate member which permits removal of the pads from the caliper assembly, said second connection comprising an opening on one of said torque plate member and said unitary caliper assembly, and a pivot pin extending between said caliper assembly and said torque plate member and cooperating with said opening to pivotally support said unitary caliper assembly on said torque plate member in a location which enables the former to be pivoted relative to the latter to a position permitting removal or replacement of said pads following complete release of said two sets of sliding surfaces.

2. A disc brake as claimed in claim 1 wherein said two sets of sliding surfaces comprise a pair of pin assemblies, each of which is secured to one of said torque plate member and said caliper assembly and slidable in an opening in the other thereof.

3. A disc brake as claimed in claim 2 in which each of said pin assemblies is secured releasably to said one of said torque plate member and said caliper assembly.

4. A disc brake as claimed in claim 2 in which said pair of pin assemblies are secured to the caliper assembly and slidable in respective openings in the torque plate member.

5. In the disc brake of claim 2 wherein each of said openings comprises a bore in said other of said torque plate member and said caliper assembly and each of said pin assemblies comprises a plunger having a threaded hole extending in an axial direction through one end thereof; said plunger being slidably received in the bore in said other of said torque plate member and caliper assembly, a lug on said one thereof and having an aperture therein in axial alignment with said threaded hole, and a clamping screw extending through said aperture and into the threaded hole in said plunger, said clamping screw and said plunger having opposed abutment surfaces clamping between them the opposed faces of said lug at opposite ends of said aperture when said clamping screw is screwed into said threaded hole.

6. In the disc brake of claim 2 wherein each of said pin assemblies is disposed within the periphery of said disc.

7. A disc brake as claimed in claim 1 wherein said pivot pin is releasable from said torque plate member and said caliper assembly, and means on one of said torque plate member and said caliper assembly for normally supporting said pivot pin at an alternative location from that in which the pin pivotally supports said caliper assembly on said torque plate member.

8. A disc brake as claimed in claim 7 in which the alternative pin supporting means is on the caliper member in a position wherein said pin supports the friction pads.

9. A disc brake as in claim 1 including a second opening on the other of said torque plate member and said unitary caliper assembly normally aligned with the first mentioned opening when said first connection is intact.

10. A disc brake as in claim 1 in which said pivot pin is releasable from said torque plate member and said caliper assembly and normally separated from said opening so that said second connection is not existent during normal operation of said disc brake.

11. In the disc brake of claim 1 wherein said second connection includes a second opening in the other of said torque plate member and said caliper assembly, both of said openings receiving said pivot pin.

12. In the disc brake of claim 11 wherein the axes of said openings are parallel to the axis of disc rotation and said pivot pin when received in said openings is axially withdrawable from said openings.

13. In a sliding caliper disc brake of the type comprising a torque plate member adapted for fixing to a vehicle frame or like portion, a unitary caliper assembly, means moveably mounting said caliper assembly on the torque plate member, said caliper assembly being operable upon spot-type friction pads for moving the same into engagement with opposed faces of a rotatable disc, said caliper assembly being constructed that the pads cannot be removed or replaced with the caliper assembly in its normal operative position relative to the disc, said mounting means comprising a first releasable connection between the unitary caliper assembly and the torque plate member, said first connection comprising two sets of sliding surfaces disposed one set on each circumferential side of the caliper assembly, said two sets of sliding surfaces being constructed and arranged to permit movement of the caliper assembly relative to the torque plate member only in the direction of the axis of disc rotation and also being arranged that said caliper assembly cannot be moved to a position in which the pads may be removed from the caliper assembly without complete release of said two sets of sliding surfaces, the improvement comprising means for providing a second connection between sad caliper assembly and the torque plate member independent of said two sets of sliding surfaces for enabling said caliper assembly to be moved to a position relative to said torque plate member which permits removal of the pads from the caliper assembly, said means comprising openings in said caliper assembly and said torque plate member arranged for axial alignment with each other for the reception of a pivot pin therein, said openings being so positioned that when said pivot pin is received therein and said two sets of sliding surfaces are completely released, said caliper assembly is supported through the cooperation of said pin and openings on said torque plate member in a position wherein the former may be pivoted relative to the latter to a position permitting removal or replacement of said pads.

* * * * *